United States Patent [19]
Stripling

[11] 3,789,677
[45] Feb. 5, 1974

[54] POLARIZED AIR BEARING ASSEMBLY

[75] Inventor: William W. Stripling, Huntsville, Ala.

[73] Assignee: The United States of America as represented by the Secretary of the Army, Washington, D.C.

[22] Filed: Sept. 19, 1972

[21] Appl. No.: 290,289

[52] U.S. Cl. ............................. 74/5.7, 308/DIG. 1
[51] Int. Cl. ............................................. G01c 19/20
[58] Field of Search .... 308/DIG. 1; 74/5 R, 5.7, 5.1

[56] References Cited
UNITED STATES PATENTS
| | | | |
|---|---|---|---|
| 3,238,792 | 3/1966 | Unterberger | 74/5.7 |
| 2,539,363 | 1/1951 | Dawson | 74/5.7 |
| 2,976,736 | 3/1961 | Cook | 74/5 R X |
| 3,238,790 | 3/1966 | Schulien et al. | 74/5 R |

*Primary Examiner*—Manuel A. Antonakas
*Attorney, Agent, or Firm*—Edward J. Kelly; Herbert Berl; Charles R. Carter

[57] ABSTRACT

A bearing assembly for use in supporting a gyro rotor in a missile during flight in a missile trajectory. During acceleration the outer bearing support is supported by a mounting plate. Air under pressure is utilized to provide an air bearing film to support a hemispherical outer bearing support of the rotor for rotation around the stator during deceleration. A pin secures the rotor in place during shipment or storage and is sheared during missile acceleration.

2 Claims, 2 Drawing Figures

Patented Feb. 5, 1974  3,789,677

POLARIZED AIR BEARING ASSEMBLY

BACKGROUND OF THE INVENTION

This invention relates to polarized air bearing assemblies. Because terminal guided missiles experience high acceleration shock when launched from a cannon (12,000–15,000 G's) conventional gyro and seeker bearing design is difficult and expensive. This high acceleration shock overstresses the forward area of a conventional spherical hydrostatic air bearing design and this same bearing area is unloaded during the deceleration or terminal phase of the trajectory. Alignment of the two halves of the conventional hydrostatic air bearing is extremely critical. Any misalignment results in excessive drift. The cost of proper alignment is approximately half the cost of the total gyro.

SUMMARY OF THE INVENTION

This invention utilizes the fact that the forward hemisphere of the air bearing is not required to support any load during gyro or seeker use since the missile is decelerating. During the acceleration phase, the rear hemisphere is supported by a mounting plate by the rotor.

This invention may be better understood from the following detailed description taken in conjunction with the accompanying drawing.

DESCRIPTION OF THE PREFERRED EMBODIMENT

Figure 1:
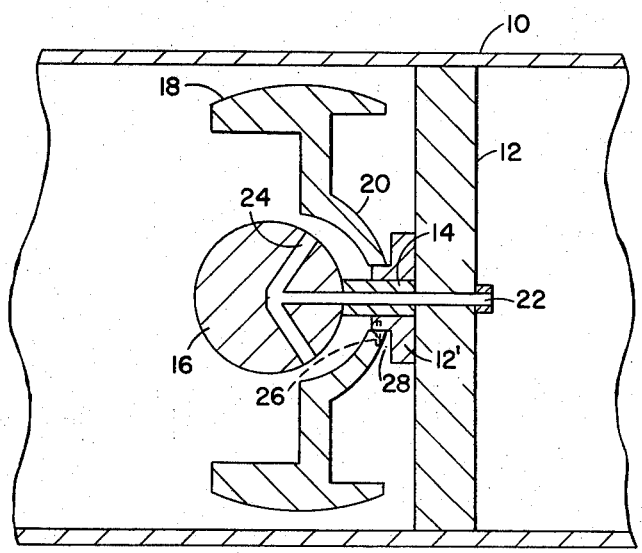
FIG. 1 is a diagrammatical view of the assembly prior to missile acceleration.
Figure 2:
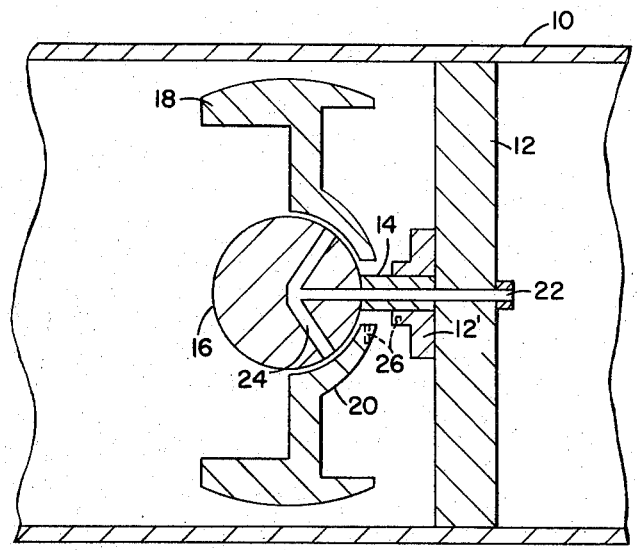
FIG. 2 is a diagrammatical view of the assembly during missile deceleration.

Reference numeral 10 indicates part of a missle housing having a mounting plate 12 attached thereto. A shaft 14 has one end mounted on plate 12 and a spherical gyro stator 16 is connected to the opposite end of the shaft. Gyro rotor 18 is integrally connected to a hemispherical outer bearing support 20. Air under pressure is supplied by conduit 22 to the stator. Restrictors 24 allow passage for the air to be introduced at points between the stator and the rotor to provide an air bearing film therebetween.

In the position shown in FIG. 1, just prior to acceleration, the rotor is secured to an extension 12' of the mounting plate by a shear pin 26. A recess 28 is provided between the mounting plate extension and the hemispherical outer bearing support 20. When the missile is fired from a cannon inertia causes rotor 18 to shift its position in FIG. 1 thereby shearing pin 26. The support 20 will engage with and be supported and held stationary by the plate 12 and its extension 12'. When the missile enters its deceleration phase, the rotor is spun up by means (not shown), support 20 then is supported by the air bearing film and the rotor is solely supported by air bearing film for rotation around the stator 16 until missile trajectory termination.

I claim:

1. A polarized air bearing assembly for use in supporting a gyro in a missile comprising: a mounting plate attached to said missile; a shaft having an end mounted on said plate; a spherical gyro stator connected to the opposite end of said shaft; a gyro rotor disposed for rotation around said stator, said rotor including a single hemispherical outer bearing support; said stator provided with a plurality of restrictors for introducing air under pressure to a point between said stator and said outer bearing support to form an air bearing film therebetween; and means for securing said hemispherical outer bearing support to said mounting plate.

2. An assembly as set forth in claim 1 wherein said securing means is a shear pin and said mounting plate is provided with a recess to allow movement of said hemispherical outer bearing support and said mounting plate for shearing said pin.

* * * * *